Oct. 7, 1958 D. E. WIEGAND 2,855,464

ELECTROMAGNETIC HEAD

Filed June 20, 1952 3 Sheets-Sheet 1

Inventor
David E. Wiegand
by Hill, Sherman, Meroni, Gross & Simpson Attys

ELECTROMAGNETIC HEAD

Filed June 20, 1952 3 Sheets-Sheet 2

Inventor
David E. Wiegand
by Hill, Sherman, Meroni, Gross & Simpson Attys

Inventor
David E. Wiegand
by Hill, Sherman, Meroni, Gross & Simpson Attys 2,855,464

ELECTROMAGNETIC HEAD

David E. Wiegand, Villa Park, Ill., assignor to Armour Research Foundation of Illinois Institute of Technology, Chicago, Ill., a corporation of Illinois Application June 20, 1952, Serial No. 294,684

27 Claims. (Cl. 179—100.2)

The present invention is concerned with an improved electromagnetic transducing head, and is particularly directed to an electromagnetic reproducing head capable of high level response even at zero frequency.

The present invention provides means for reproducing signals recorded on a magnetic impulse record member, and operates on a principle similar to that employed in the saturation type magnetometers and gradiometers used to measure distortions in the earth's magnetic field. From frequency analysis studies, it can be shown that if an iron cored coil carries a sine wave of current, the voltage across its terminals will have odd harmonic components only, in the absence of a constant (D. C.) polarizing flux. However, if the core is provided with a D. C. component, the voltage across the terminals will have the even harmonics in addition to the odd harmonics. The absence of even harmonics in the absence of a D. C. polarizing flux is due to the fact that while the B–H curve for ferromagnetic materials is, in general, not linear, the portions of the curve in the first and third quadrants are symmetrical about the origin.

When a polarizing flux is present, however, the variation of the field is no longer symmetrical with respect to the time axis, and the induced voltage wave is non-symmetrical about the time axis. It therefore contains even order harmonics.

It can be shown in a similar manner that with a sine wave of voltage applied to the coils, the current in the coils has fundamental and odd order harmonics only when no polarization exists and that when polarization is present, the current also contains even order harmonics.

The present invention takes advantage of this effect and provides means for separating and measuring one or more of the even order harmonics of current or voltage in a reproducing head energized by a relatively high frequency source, thereby providing a sensitive means for measuring very small polarizing fluxes.

An object of the present invention is to provide an improved magnetic transducing assembly which is sensitive to very low frequency signals.

Another object of the present invention is to provide an improved magnetic reproducing head capable of detecting recorded signals of very low frequency, including zero frequency.

Another object of the present invention is to provide an improved magnetic reproducing head having a substantially higher signal output than conventional magnetic reproducing heads.

Another object of the present invention is to provide an improved magnetic transducing system including the type of transducing head above mentioned.

The novel features which I believe to be characteristic of my invention are set forth with particularity in the appended claims. My invention itself, as to its organization, manner of construction, and method of operation, together with further objects and advantages thereof may best be understood by reference to the following description, taken in connection with the accompanying drawings, in which:

As shown on the drawings.

Figures 1, 2:
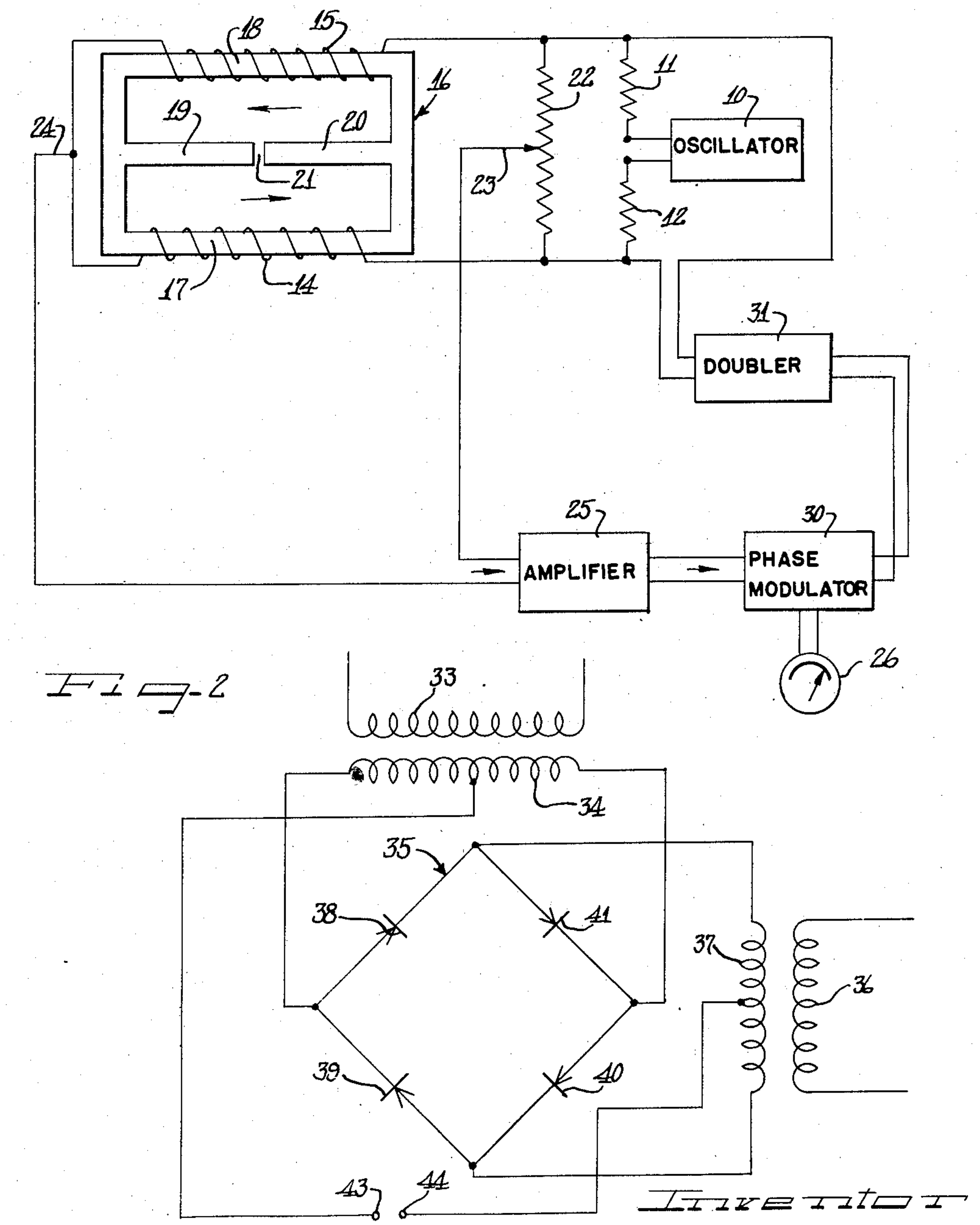
Figure 1 is a circuit diagram of a magnetic reproducing assembly employing a balanced circuit.
Figure 2 is a circuit diagram of the phase modulator included in the circuit of Figure 1.

The circuit of Figure 1 includes an oscillator which may be of any conventional design, and which is capable of generating a signal substantially above the frequencies to be reproduced from the magnetic impulse record member, the output of the oscillator 10 being ordinarily on the order of 20 to 40 kilocycles per second. The current from the high frequency oscillator 10 is fed through a pair of voltage dropping resistors 11 and 12 into a pair of oppositely disposed coils 14 and 15 wound around a ferromagnetic core generally indicated at 16. The coils 14 and 15 include substantially the same number of turns, and are of the same diameter wire. The core structure 16 includes a plurality of legs, including outer legs 17 and 18 upon which the coils 14 and 15 are trained respectively, and center legs 19 and 20 whose respective end portions are spaced apart to provide a non-magnetic gap 21 therebetween, over or through which a magnetic impulse record member is arranged to pass. Thus, the systems of the present invention are applicable to longitudinal, transverse, or lateral recording.

A potentiometer 22 with a variable tap 23 is also provided across the output of the oscillator 10, and the output between the tap 23 and the junction of coils 14 and 15, indicated at numeral 24, is fed to a high gain tuned amplifier 25.

The circuit described thus far is, in essence, a bridge circuit which can be balanced so that with the tap 23 at the mid-point, there is no voltage input to the amplifier 25 with a de-magnetized medium at the gap 21, or with no medium in the head. Since some slight dissymmetry is to be expected in the core structure, the system is balanced with a de-magnetized medium at the head, by the adjustment of the potentiometer 22.

The amplifier 25 is of the tuned type, and operates at a frequency corresponding to an even order harmonic of the frequency being generated by the oscillator 10, and preferably at a frequency corresponding to the second harmonic of the oscillator frequency. The predominating frequency appearing at the input to the amplifier 25 is the second harmonic of the oscillator frequency, as will be indicated from the following consideration. The oscillator 10 supplies a high frequency current to the coils 14 and 15 of a magnitude sufficient to bring the level of magnetization during one half cycle of the oscillator current to a value at or near saturation in one of the legs 17 or 18. For example, assume that the oscillator 10 is at a portion of its cycle which would saturate the leg 18, and that at the same time a signal is received from a magnetic impulse record member appearing across the gap 21 which would tend to aid the flux in the leg 18 while decreasing the flux in the leg 17. Since the leg 18 is already at saturation, the added signal has no effect upon the flux, while in leg 17, the added signal has the effect of decreasing the flux in that leg from its saturation value, giving rise to an unbalance in the bridge circut, with a resultant voltage appearing across the input to the amplifier 25. During the next half cycle of the oscillator operation, the leg 17 would be at saturation, unbalancing the bridge in the opposite direction, but at the same time the polarity of the oscillator output has been changed so that the next half cycle input to the amplifier 25 is the same as for the proceeding half cycle. The net result is a high frequency wave with a predominating frequency of twice the frequency of the output of the oscillator 10.

If an alternating signal flux appears at the gap 21, the high frequency output will be modulated in accordance with the alternating variations appearing at the gap. The magnitude of the modulation is proportional to the amplitude of the signal flux at the gap 21, regardless of its polarity, so that positive and negative cycles give a similar output. There is, however, a difference in phase of the high frequency component parts of consecutive half cycles of the resulting modulated wave. This difference in phase can be used to distinguish between positive and negative cycles of signal flux at gap 21, as follows: the output of the tuned amplifier 25 is passed to a phase modulator 30, where the signal is mixed with a relatively high constant amplitude signal derived from a frequency doubler 31, which may be of any conventional type frequency doubling circuit. The input of the doubler 31 is derived from the output of the oscillator 10, and is of an amplitude greater than the amplitude of the signal appearing at the output of the amplifier 25.

A typical phase modulator and rectifier circuit is illustrated at Figure 2 of the drawings. The signal from the tuned amplifier 25 appears across a coil 33 and is inductively coupled to a rectifier network 35 by means of a secondary winding 34. Similarly, the output from the doubler 31 appears across a coil 36 and is inductively coupled to the opposite side of the rectifier network 35 through a secondary winding 37. The rectifier network 35 consists of four rectifier elements 38, 39, 40 and 41 connected to provide full wave rectification of the input signal. The output of the mixer-rectifier circuit described is taken from the center tap on the coils 34 and 37 as shown, and appears at a pair of output terminals 43 and 44. The voltage at the terminals is applied to a sensing device, such as a meter 26 or to an amplifier and loud-speaker circuit for reproducing recorded intelligence.

In the phase modulator, the constant amplitude signal from the frequency doubler is mixed with the modulated signal from the amplifier. Modulation resulting from signals of one polarity at gap 21 will add to the constant signal from the doubler, while those of the opposite polarity substract from the constant signal. The resulting wave, before rectification, has an envelope which varies in exact accordance with the signal impressed at the gap 21. After rectification, the signal is an accurate reproduction of the flux at gap 21.

Figure 3:
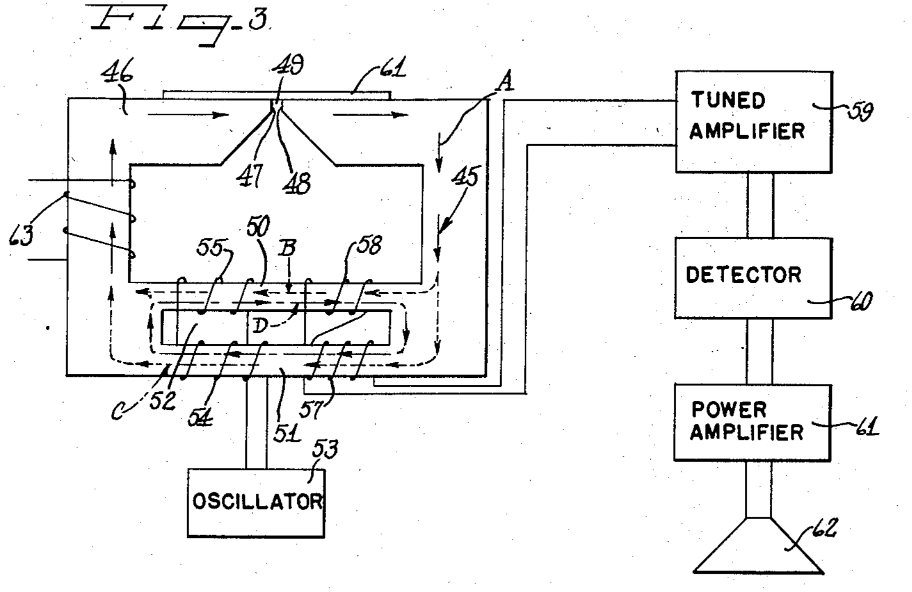
Figure 3 is a circuit diagram including the improved electromagnetic head of the present invention and the other associated elements in the magnetic transducing assembly.

A modified form of this system is illustrated in Figure 3 of the drawings. In this form of the invention, the magnetic transducing head includes a core structure 45 including a relatively wide leg, generally indicated at 46 having confronting end portions 47 and 48 defining a non-mangetic gap 49 therebetween. The core 45 also includes a narrower intermediate cross leg 50 and a narrow base leg 51 spaced therefrom by the slot 52.

The output of a relatively high frequency oscillator 53 is fed to the core 45 through a pair of windings 54 and 55 connected in series aiding relationship. While the windings 54 and 55 are illustrated as being disposed separately on the legs 50 and 51, in the preferred form of the invention, the windings 54 and 55 are wound in a bifilar manner with respect to coils 57 and 58, that is, the turns of coil 54 are wound between the turns of coil 57, and the turns of 55 are wound in between the turns of coil 58 to increase the coupling and reduce unbalance between the coils. The same number of turns appear on leg 54 as appear on leg 55, so that the coils 54 and 55 are substantially identical in their magnetic behavior.

Similarly, a second pair of coils 57 and 58 are connected in series opposing relationship on the legs 50 and 51, and the output therefrom is connected to the input circuit of a tuned amplifier 59.

The structure thus far described provides three magnetic circuits for flux flowing in the core 45. The various circuits have been indicated by arrows in the drawings. As a magnetic impulse record member 61 is passed across the non-magnetic gap 49, a magnetic flux may be set up in the core 45 in the direction of the solid arrows labeled "A." In the vicinity of the legs 50 and 51, the main flux path indicated by "A" is split into a pair of parallel paths identified by the dashed line label "B" in leg 50 and the dashed flux line "C" in leg 51. The paths "B" and "C" recombine in the wider legs of the core to provide a pair of flux paths which pass through the non-magnetic gap 49 in the same direction.

At the same time, the output of the oscillator 53 sets up a localized flux pattern about the legs 50 and 51, identified by the dashed line "D." As shown in the drawings, the flux "D" at one instant may oppose the main flux in the circuit identified by dashed line "B," while it aids the flux represented by the dashed line "C." Thus, the magnetic core 45 includes three cooperating magnetic flux paths, the first of these being the flux path which includes the leg 46 and the leg 50, the second including leg 46 and leg 51, and the third being the localized flux path due to the high frequency current, the latter being substantially confined to the path including the legs 50 and 51.

The dimensions of the core are such that the magnetic fluxes along path "A" and paths "B" and "C" produced by the signal on the tape are insufficient to saturate the core, but preferably the legs 50 and 51 are narrowed sufficiently so that with the maximum signal intensity on the record member 61, the flux density in the legs 50 and 51 is well up the magnetization curve, such, for example, as one-third to two-thirds of saturation. It is the stronger oscillator flux which causes saturation or near saturation in the legs 50 and 51.

In the form of the invention illustrated in Figure 3, the magnetic circuit is unbalanced in the quiescent condition by providing a constant, non-alternating magnetic field in the core structure 45. This is accomplished by providing a winding 63 around one leg of the core, and energizing the winding 63 with a source of direct current. Alternatively, the non-alternating field can be supplied by providing a permanent magnet in proximity to the core. As a result, even with no signal appearing across the non-magnetic gap 49, a constant amplitude signal of a frequency twice that of the oscillator 53 appears at the input to the tuned amplifier 59. The level of D. C. polarization is sufficiently high so that the resultant modulation of the high frequency magnetic field by the signal received at the non-magnetic gap 49 does not reduce the net magnetic field to zero. Consequently, with no signal flux at gap 49, there is a constant high frequency input to amplifier 59, due to the D. C. polarization. Signal flux of one polarity at gap 49 increases this high frequency signal, while signal flux of opposite polarity decreases the high frequency signal. Thus, the modulation envelope varies in accordance with the signal flux, and a phase modulator system as in Fig. 1 is unnecessary.

As in the preceding form of the invention, the signals from the oscillator 53 are of sufficient amplitude to maintain one or the other of the legs 50 or 51 at or near saturation during a portion of each cycle. As a result, assuming the instantaneous flux distribution shown in Figure 3, the high frequency flux "D" opposes the main flux "B" in leg 50, and aids the flux "C" in leg 51. Since the leg 51 is already at magnetic saturation, no effect is produced, but in leg 50, the magnetic reluctance of the path is effectively changed by the presence of the opposing fluxes, and the output signal from coils 57 and 58 is a function of the signal appearing across the non-magnetic gap 49. In succeeding half cycles of the high frequency component, the situation is periodically reversed, with respect to legs 50 and 51, but the output due to unbalance remains the same. As the signal flux across gap 49 varies, the amount of unbalance varies accordingly, and the resulting modulated wave appearing at the input of the tuned amplifier 59 is a faithful reproduction of the signal appearing at the non-magnetic gap 49.

The output of the tuned amplifier 59 is fed to a detector 60 where the high frequency components are removed and the envelope of the modulated wave is passed to a power amplifier 61 of a conventional type. The final output is transmitted to a sensing means such as a loudspeaker 62, or the detector output may operate a meter, oscilloscope, etc., for instrumentation work.

Figure 4:
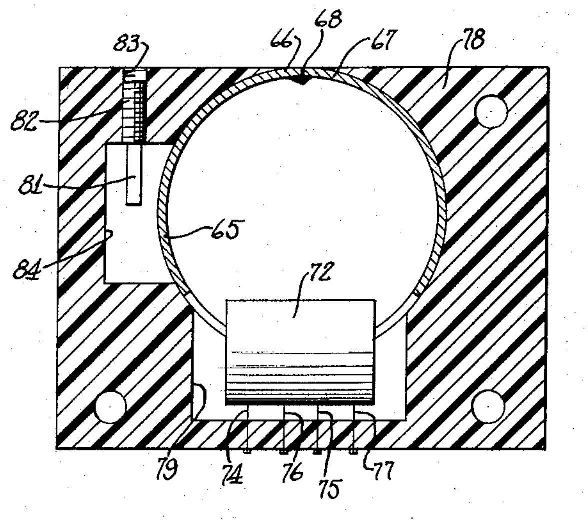
Figure 4 is a view in elevation of a modified form of the invention illustrating a preferred embodiment of head design.
Figure 5:
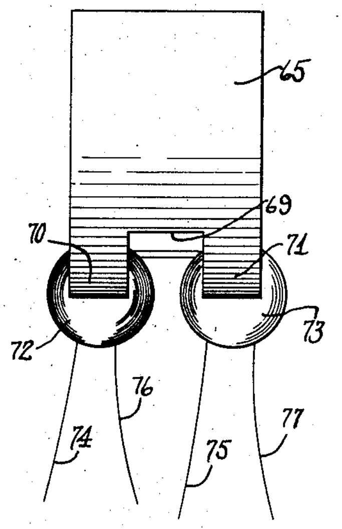
Figure 5 is a side elevational view of the head of Figure 4, removed from the housing, and illustrating the manner in which the coils are trained about the core structure.

A preferred form of head assembly for use in connection with this invention is that illustrated in Figures 4 and 5 of the drawings. In this form of the invention, a magnetic core 65 of relatively thin metallic stock is bent into a circular form, with its opposing end portions 66 and 67 being spaced to provide a non-magnetic gap. A non-magnetic spacer 68 composed of solder, copper, or the like, is secured in position between the opposed end portions 66 and 67.

The core 65 is provided with a peripheral slot 69 providing a pair of branch legs 70 and 71 at the base of the ring type core (Figure 5). A double pair of coils 72 and 73 are disposed about the branch legs 70 and 71 and preferably constitute a double pair of bifilar windings as previously described. A pair of input leads 74 and 75 are arranged to be connected to the output of the oscillator, while a pair of output leads 76 and 77 are arranged to be connected to the input of the tuned amplifier.

The ring core structure 65 is set into a centrally recessed mounting block 78 composed of non-magnetic material. The exterior of the mounting block may be surrounded by magnetic shielding material, such as "mu" metal. The block 78 is suitably recessed as at 79 to provide space for the coils 72 and 73.

The polarizing flux which unbalances the magnetic circuit is provided by a small permanent magnet 81 which is carried at one end of a threaded screw 82. The latter is received within an internally threaded bore 83 of the block 78. The latter is also recessed as indicated at 84 to provide an air gap between the permanent magnet 81 and the ring core 65. Movement of the threaded screw 82 into and out of the threaded bore 83 thereby effectively changes the level of polarization in the magnetic core structure. It should be noted that the phase modulator used in the circuit of Figure 1 can be used in the circuits of the remaining head structures, if the source of D. C. polarization is eliminated. Similarly, the phase modulator of Figure 1 can be eliminated if the head of Figure 1 is provided with a source of D. C. polarization. As a further alternative, both the phase modulator and the extraneous D. C. polarization can be eliminated if the magnetic record member itself is recorded with a sufficiently high level D. C. component.

Figure 6:
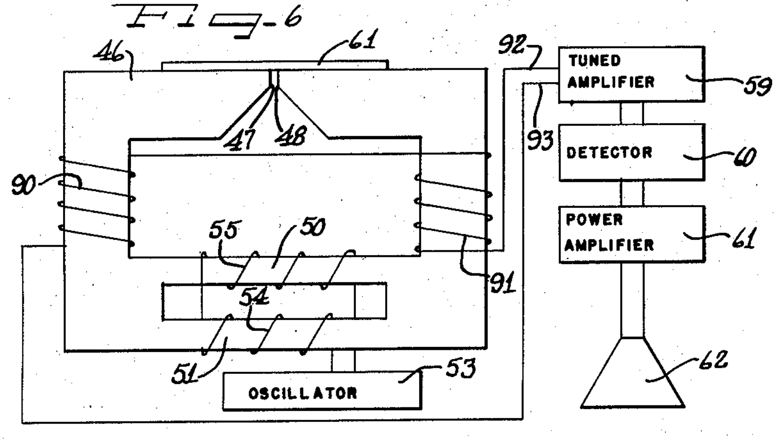
Figure 6 illustrates schematically another arrangement in which additional coils are provided in the core.

A modified form of the invention is illustrated in Figure 6 of the drawings. In this form of the invention, the core structure itself is identical with that illustrated in Figure 3, but the coil arrangement has been modified by the addition of a pair of signal coils 90 and 91 connected in series opposition to the opposed legs of the core structure in place of the coils 57 and 58 used in the system of Figure 3. The coils 54 and 55, fed from the oscillator 53 are the same in this form of the invention as that of Figure 3. The added coils 90 and 91 are advantageous when the head is used as a recording head, as they eliminate saturation effects during recording. A pair of leads 92 and 93 feed the output of the coils 90 and 91 to the tuned amplifier 59 during reproducing, and during recording these leads are switched to the output of recorder amplifier and the high frequency bias supply.

Figure 7:
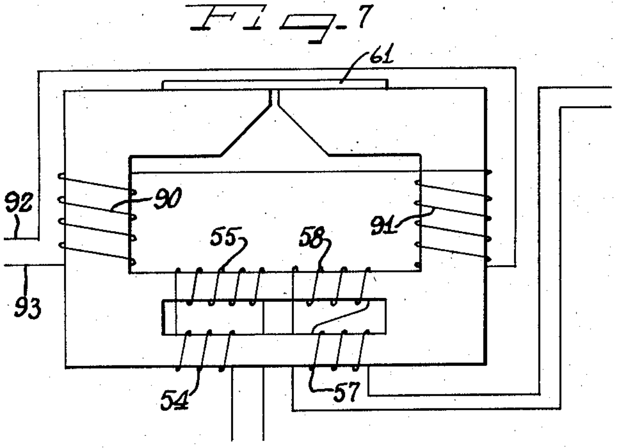
Figure 7 illustrates a modification of the head structure which is particularly advantageous for recording purposes.

A still further modified form of the invention is illustrated in Figure 7. This system uses both the signal coils 90 and 91 as in the system of Figure 6, and also employs the two pairs of coils 54, 55, 57 and 58 connected as illustrated in Figure 3 of the drawings, i. e., the coils 54 and 55 are connected in series aiding relationship and are energized from the oscillator, and the output of the coils 57 and 58 is passed into the input of the tuned amplifier. The leads 92 and 93 are connected during recording to the recording amplifier and the bias supply of the recording system.

Figure 8:
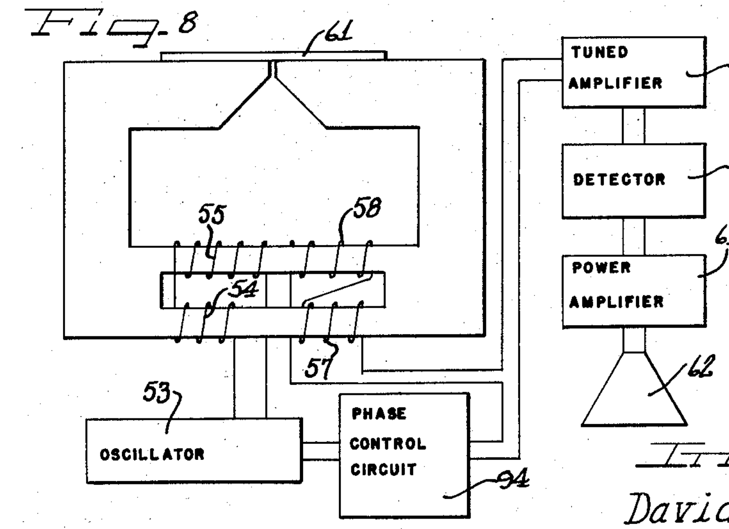
Figure 8 illustrates schematically another type of arrangement for producing a balanced magnetic circuit.

Another balanced type system is illustrated in Figure 8 of the drawings. The core structure is identical with the cores of Figures 3, 7 and 8. The pair of coils 54 and 55 are energized from the oscillator 53 with a current at the fundamental frequency of the oscillator output. The coils 57 and 58, wound in series opposing relation, are connected in series with a high frequency source, which conveniently can be derived from a portion of the oscillator circuit in which the prevailing frequency is the second harmonic of the frequency used to energize the coils 54 and 55. A phase control circuit 94 is provided to adjust the phase of the high frequency component being fed to the coils 57 and 58 to be in phase with the high frequency modulated signal picked up by the coils 57 and 58 by the passage of the record member across the recording gap.

The mixing of the high frequency component with the modulated signal effectively serves as a phase modulator, and eliminates the need for a phase modulator of the type shown in Figure 2. In one-half cycle the modulated signal adds to the constant amplitude high frequency component, while in the next half cycle, because of the difference in phase in succeeding half cycles, the modulated signal subtracts from the high frequency component, resulting in phase revolution in the resulting wave form. A signal whose carrier frequency is twice the fundamental frequency of the oscillator output, and whose modulator envelope is an accurate reproduction of the signal recorded on the tape is then fed to the tuned amplifier 59 which is tuned to a frequency of twice the fundamental frequency of the oscillator output. The detector 60 following the tuned amplifier 59 demodulates the signal, and a power amplifier 61 amplifies the audio signal prior to passage of the audio signal into the loudspeaker 62.

Figure 9:
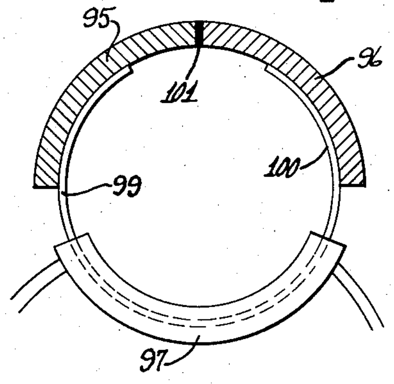
Figure 9 is a cross-sectional view, with parts in elevation of an improved ring-type head employed in the circuits of the present invention.
Figure 10:
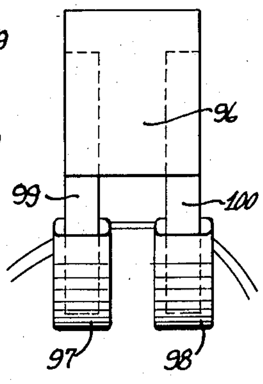
Figure 10 is a side elevational view of the head of Figure 9.

An improved form of head structure for use in the systems of the present invention is illustrated in Figures 9 and 10 of the drawings. The main body of the core structure includes a pair of segmental sections 95 and 96 composed of relatively thick and wide ferromagnetic strip material, while the coils 97 and 98 are disposed on a pair of separate thin, relatively narrow strips 99 and 100 of ferromagnetic material. The opposed ends of the sections 95 and 96 are separated by a non-magnetic spacer 101, and the strips overlapped with the sections 95 and 96 and are in pressed engagement with the inner surfaces of the sections. This type of head structure has the advantage that the thin, narrow strips 99 and 100 are more easily saturated magnetically. Manufacture of the head structure is also facilitated by the fact that the coils 97 and 98 may be preformed on a mandrel, and then slipped over the strips 99 and 100 prior to engaging the strips with the sections 95 and 96.

One of the more remarkable characteristics of the magnetic heads of the present invention is their high level output. Signal voltages of 200 to 300 millivolts are received from the heads of the present invention, whereas in ordinary magnetic reproducing heads, maximum signal levels on the order of two to three millivolts are common. As a result, the heads of the present invention may be used with a minimum of amplifying stages, and in most instances, a single pentode amplifier following the magnetic head, in combination with a detector and a power amplifier provide sufficient gain for operating a loudspeaker.

From the foregoing, it will be appreciated that the transducing head of the present invention provides a head which is extremely sensitive to low frequencies, and even to a constant, non-alternating magnetic field. The heads of the present invention will find extensive use in applications where size is a controlling factor, since the output level of the head is sufficiently high so that the amplification required is held to a minimum. The present invention is particularly adaptable to magnetic recording applications in which the recording is made at a very high speed and then analyzed in detail, such as the recording of transients or computer memory devices. With the system of the present invention, the recording can be played back at greatly reduced speed. In fact, measurements on the recording can be made point by point with the medium being stationary for each reading. If desired, the medium may be moved by a micrometer adjustment of sufficient fineness that a particular point in the recording can be located to a tolerance on the order the scanning gap width.

It will be understood that modifications and variations may be effected without departing from the scope of the novel concepts of the present invention.

I claim as my invention:

1. An electromagnetic reproducing assembly comprising a magnetic core providing three flux paths therein, two of said flux paths including a pair of closely spaced confronting poles defining a non-magnetic gap therebetween for coupling the core to magnetic record media of predetermined maximum residual flux capacity, and the third of said flux paths not including said non-magnetic gap but including portions of said core in common with the other two flux paths, a first pair of coils on said core wound and electrically connected in aiding relation with respect to said first and second flux paths and in opposing relation with respect to said third flux path, a second pair of coils on said core wound and electrically connected in opposing relation with respect to said first and second flux paths and in aiding relation with respect to said third flux path, a high frequency alternating current source energizing said second pair of coils with a relatively high frequency alternating current, means creating a constant amplitude magnetic flux in said core, a tuned amplifier responsive to signals of an even order harmonic of the fundamental frequency of said high frequency alternating current, and means connecting said first pair of coils with said amplifier, said magnetic core comprising a pair of strips of magnetic material of reduced cross section in comparison with the cross section of other parts of said two flux paths and extending through the respective second coils, said strips being of sepaarte and independent construction and assembly from other portions of said core and each providing a part of one of said two flux paths and part of said third flux path, and said strips being of a cross section such that a maximum signal on a record medium of said maximum residual flux capacity when coupled to said core at said gap will produce a flux density in said strips of the order of one-third the saturation flux density for the material of said strips.

2. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a first pair of coils on said core wound and electrically connected in aiding relation with respect to said first and second flux paths and in opposing relation with respect to said third flux path, a second pair of coils on said core wound and electrically connected in opposing relation with respect to said first and second flux paths and in aiding relation with respect to said third flux path, a high frequency alternating current source energizing said second pair of coils with a relatively high frequency alternating current, means creating a constant amplitude magnetic flux in said first and second flux paths in the same direction at said gap, a demodulator, and means connecting said first pair of coils to said demodulator.

3. An electromagnetic reproducing head including a ring-type core having confronting end portions defining a non-magnetic gap therebetween, said core having a relatively broad axial extent and a relatively thin radial extent and having a peripheral slot therein intermediate the edges thereof forming a pair of intermediate legs, a pair of coils disposed on each leg, one coil of one of said pair of coils being connected in series aiding relationship with one coil of said other pair, and the other coil of said one pair being connected in series opposing relationship with the other coil of said other pair.

4. An electromagnetic reproducing head including a ring-type core having confronting end portions defining a non-magnetic gap therebetween, said core having a relatively broad axial extent and a relatively thin radial extent and having a peripheral slot therein intermediate the edges thereof, a pair of bifilar windings disposed on opposite sides of said slot, each of the individual windings of said bifilar windings being connected in series with a different one of the windings on the opposite side of said slot, one pair of coils being connected in series aiding relationship and the other pair of coils being connected in series opposing relationship.

5. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a first pair of coils on said core wound and electrically connected in aiding relation with respect to said first and second flux paths and in opposing relation with respect to said third flux path, a second pair of coils on said core wound and electrically connected in opposing relation with respect to said first and second flux paths and in aiding relation with respect to said third flux path, a high frequency alternating current source energizing said second pair of coils with a relatively high frequency alternating current, a source of alternating current of a frequency corresponding to an even order harmonic of said high frequency alternating current separate from said core and electrically connected in series with said first pair of said coils, and a tuned amplifier responsive to signals at the frequency of said even order harmonic receiving signals from said first pair of coils.

6. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a first pair of coils on said core wound and electrically connected in aiding relation with respect to said first and second flux paths and in opposing relation with respect to said third flux path, a second pair of coils on said core wound and electrically connected in opposing relation with respect to said first and second flux paths and in aiding relation with respect to said third flux path, a high frequency alternating current source energizing said second pair of coils with a relatively high frequency alternating current, a tuned amplifier responsive to signals of an even order harmonic of the fundamental frequency of said high frequency alternating current, means connecting said first pair of coils with said amplifier, a source of alternating current of a frequency corresponding to an even order harmonic of said high frequency alternating current connected in series with said first pair of said coils, a demodulator, and means connecting said first pair of coils to said demodulator.

7. An electromagnetic transducing head comprising a pair of segmental sections of relatively wide and relatively thick magnetic material having opposed ends separated by a non-magnetic gap, a pair of relatively thin and relatively narrow strips of magnetic material engaging flatwise said pair of segmental sections to form a circular ring-type core, and a pair of coils on each of said strips, one coil of each pair being connected to a different one of the coils of the pair on the other strip, the connected coils of one group being in series aiding relationship, and the connected coils of the other group being in series opposing relationship.

8. An electromagnetic reproducing apparatus comprising a magnetic core having a non-magnetic gap and providing first and second flux paths including said non-magnetic gap, a first winding linking said first flux path, a second winding linking said second flux path, means for energizing said first and second windings for producing relatively high frequency fluxes in said first and second flux paths substantially equal in magnitude but oppositely directed in said gap, output means for deriving an amplitude modulated electric output generated by unbalance of the fluxes in said core due to an external signal flux at said gap, and a phase modulator system connected with said output means for correcting the phase distortion of said output to produce a resultant high frequency wave having an envelope which varies in accordance with changes in polarity of the external signal flux at said gap.

9. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a pair of coils on said core wound and electrically connected in opposing relation with respect to said first and second flux paths and in aiding relation with respect to said third flux path, a first high frequency alternating current source energizing said pair of coils with a relatively high frequency alternating current, output means for deriving an electric output from said core when an external flux is exerted at said gap, a full wave rectifier bridge network, means for connecting the output means to one pair of terminals of said network, a second source of alternating current having an output comprising an even order harmonic of said first source, and means for delivering the output of said second source to the other pair of terminals of said network to correct the phase distortion in the output of said output means.

10. An electromagnetic transducer head for cooperation with record media having a given maximum residual flux capacity, comprising a magnetic core including a pair of core pieces defining therebetween a non-magnetic gap, and a pair of saturating core members providing with said core pieces first and second flux paths including said gap, said saturating members together providing a third flux path not including said gap, means for establishing high frequency flux components in said saturating members in aiding relation with respect to said third flux path but balanced with respect to said first and second flux paths including said gap, output means inductively coupled to said core and responsive to an unbalance of said flux components, and means creating a non-alternating polarizing flux in said first and second flux paths in the same direction at said gap unbalancing said high frequency flux in quiescent condition of the core, the cross-sectional area of said saturating members being such that the product of said cross-sectional area and the saturation induction for the material of said saturating members is between 1½ and 3 times the maximum residual flux capacity of said record media.

11. An electromagnetic transducer head for cooperation with record media having a given maximum residual flux capacity, comprising a magnetic core including a pair of core pieces defining therebetween a non-magnetic gap, and a pair of saturating members providing with said core pieces first and second flux paths including said gap, said saturating members together providing a third flux path not including said gap, means for establishing high frequency flux components in said saturating members in aiding relation with respect to said third flux path but balanced with respect to said first and second flux paths including said gap, output means inductively coupled to said core and responsive to an unbalance of said flux components, said saturating members providing a total cross-section which is substantially reduced relative to the cross section of other parts of the first and second flux paths, and means whereby the maximum residual flux capacity of the record media will produce a flux density in the saturating members between ⅓ and ⅔ of saturation for the material of said saturating members.

12. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a pair of coils on said core wound and electrically connected in opposing relation with respect to said first and second flux paths and in aiding relation with respect to said third flux path, a high frequency alternating current source energizing said pair of coils with a relatively high frequency alternating current, and means creating a constant amplitude magnetic flux in said first and second flux paths in the same direction at said gap.

13. An electromagnetic reproducing assembly comprising a magnetic core providing three flux paths therein, two of said flux paths including a first core portion and a non-magnetic gap therein, and the third of said flux paths not including said first core portion and said non-magnetic gap but including second portions of said core in common with the other two flux paths, a pair of coils on said core wound and electrically connected in opposing relation with respect to said first and second flux paths and in aiding relation with respect to said third flux path, a high frequency alternating current source energizing said pair of coils with a relatively high frequency alternating current, a further coil linking said first portion of said core exclusively, and means energizing said further winding with a source of direct current and unbalancing the flux in said gap during quiescent operation.

14. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a pair of coils on said core wound and electrically connected in opposing relation with respect to said first and second flux paths and in aiding relation with respect to said third flux path, a high frequency alternating current source energizing said pair of coils with a relatively high frequency alternating current, and permanent magnet means adjustably disposed adjacent said core for providing a constant polarizing flux therein to unbalance the flux in said core.

15. An electromagnetic reproducing assembly comprising a magnetic core providing three flux paths therein, two of said flux paths including a non-magnetic gap therein, and the third of said flux paths not including said non-magnetic gap but including portions of said core in common with the other two flux paths, a pair of coils on said core wound and electrically connected in opposing relation with respect to said first and second flux paths and in aiding relation with respect to said third flux path, a high frequency alternating current source energizing said pair of coils with a reltaively high frequency alternating current, permanent magnet means adjustably disposed adjacent said core for providing a constant polarizing flux therein to unbalance the flux in said core, and magnetic shielding means surrounding said core and said permanent magnet to eliminate the effect of the earth's magnetic field and other stray fields on the direct current operating point of the core.

16. A magnetic core construction for a magnetic modulator head comprising a pair of core pieces defining therebetween a non-magnetic gap and composed of relatively thick and wide ferromagnetic strip material having the broad dimension extending generally parallel to the gap, a pair of bridging members disposed in parallel across said magnetic gap and between said pair of core pieces, said pair of bridging members being composed of relatively thin strips of ferromagnetic material of constant rectangular cross-section between opposite free ends thereof and engaging flatwise with said core pieces, and preformed winding means mounted on each of said bridging members for establishing exciting fluxes in said members which are opposed with respect to said gap.

17. An electromagnetic reproducing assembly for use with a magnetic recording medium, comprising a magnetic core providing three flux paths therein, the first and second of said flux paths including a non-magnetic gap therein, and the third of said flux paths not including said non-magnetic gap but including first and second portions of said core in common with said first and second flux paths, respectively, a pair of coils on said core wound respectively on said first and second core portions, and electrically connected in opposing relation with respect to said first and second flux paths and in aiding relation with respect to said third flux path, a high frequency alternating current source energizing said pair of coils with a relatively high frequency alternating current, and permanent magnet means adjustably disposed adjacent said core for providing a constant polarizing flux therein to unbalance the flux in said gap, and said first and second core portions being of cross-section such that the maximum signal flux from the magnetic recording medium will produce a flux density in said first and second core portions between one-third and two-thirds of saturation for the material of said first and second core portions.

18. Means for reproducing a signal recorded on a magnetic record medium which comprises a magnetic core for coupling to succcessive portions of the recorded signal on the record medium to cause signal flux from the recorded signal to thread a flux path in said core, said core providing a cross-section of magnetic material in at least one region of said flux path of reduced cross-section to produce a maximum flux density in the region due to a maximum signal on the record medium of the order of ⅓ the value of saturation induction for the material of said region, means for establishing a rapidly fluctuating exciting flux in said flux path, and means for producing an electrical signal from the flux variation in said flux path.

19. A magnetic playback apparatus for reproducing a magnetic signal recorded on a magnetic record medium, comprising a magnetic core having a pair of pole portions defining a gap for magnetically coupling the core to a magnetic record medium and having core portions in series circuit with the respective pole portions, a pair of individual and separate bridging strips separate from said pole portions and core portions and from each other and bridging in parallel between and overlapping the core portions to define loop magnetic circuits with the pole portions and said gap, each individual and separate bridging strip providing a separate magnetic path extending the entire distance between said core portions, winding means linking said bridging strips for generating high frequency fluxes in the loop magnetic circuits which are opposed at said gap, and means operatively associated with said core for producing an electric output which reflects the polarity and magnitude of the signal flux introduced into the core at said gap by the record medium, said bridging strips having a relatively small total cross section in comparison to the cross section of said pole portions.

20. A magnetic playback apparatus for reproducing a magnetic signal recorded on a magnetic record medium, comprising a magnetic core having a pair of pole portions defining a gap for magnetically coupling the core to a magnetic record medium and having core portions in series circuit with the respective pole portions, a pair of individual and separate bridging strips separate from said pole portions and from each other and bridging in parallel between the core portions to define loop magnetic circuits with the pole portions and gap, winding means encircling said bridging strips for generating high frequency fluxes in the loop magnetic circuits which are opposed at said gap, and electrical conductor means linking said core for generating constant amplitude polarizing fluxes in the bridging strips which extend in the same direction with respect to said gap.

21. A magnetic playback apparatus for reproducing a magnetic signal recorded on a magnetic record medium, comprising a magnetic core having a pair of pole portions defining a gap for magnetically coupling the core to a magnetic record medium and having core portions in series circuit with the respective pole portions, a pair of bridging strip portions separate from said pole portions and bridging in parallel between and overlapping the core portions to define loop magnetic circuits with the pole portions and gap, said bridging strip portions having relatively small total cross section in comparison to the cross section of the pole portions, winding means linking said bridging strip portions for generating high frequency fluxes in the loop magnetic circuits which are opposed at said gap, and electrical conductor means linking said core for generating constant amplitude polarizing fluxes in the bridging strip portions which extend in the same direction with respect to said gap.

22. A magnetic playback apparatus for reproducing a magnetic signal recorded on a magnetic record medium, comprising a magnetic core having a pair of pole portions defining a gap for magnetically coupling the core to a magnetic record medium and having core portions in series circuit with the respective pole portions, an individual and separate bridging strip separate from said pole portions and core portions, said bridging strip bridging between the core portions and having its opposite ends overlapping the respective core portions to define a loop magnetic circuit with the pole portions and the core portions and said gap, winding means encircling said bridging strip for generating an exciting flux therein, and means operatively associated with said core for producing an electrical output in accordance with the signal flux introduced into the core at said gap by the record medium, said bridging strip having a relatively small total cross section in comparison to the cross section of the signal flux path provided by said pole portions and said core portions, and said winding means and output producing means comprising respective bifilar wound conductors, one for connection to a source of exciting current and the other for connection to an output circuit.

23. A magnetic playback apparatus for reproducing a magnetic signal recorded on a magnetic record medium, comprising a magnetic core having a pair of pole portions defining a gap for magnetically coupling the core to a magnetic record medium and comprising a bridging portion of magnetic material defining a loop magnetic signal flux path with said pole portions and said gap, electrical conductor means directly linking said bridging portion for generating an exciting flux therein which is directed generally longitudinally with respect to said signal flux path in said bridging portion, means operatively associated with said core for producing an electric output in accordance with the signal flux introduced into the core at said gap by the record medium, said bridging portion having a greatly reduced cross section in comparison to the cross section of the other portions of said loop magnetic path, and means whereby a maximum signal recorded on the record medium will produce a signal flux density in said bridging portion of the order of one-third the value of saturation flux density for the material of said bridging portion.

24. A magnetic playback apparatus for reproducing a magnetic signal recorded on a magnetic record medium comprising a magnetic core defining a generally loop magnetic signal flux path and having means for magnetically coupling the loop path to a magnetic record medium, means defining a portion of said loop magnetic flux path of greatly reduced flux carrying capacity in comparison with other portions of said path, means for generating an exciting flux in said portion of said loop magnetic flux path of greatly reduced flux capacity, means operatively associated with said core for producing an electrical output in accordance with the flux variation in said loop magnetic flux path, and means whereby said portion of greatly reduced flux capacity has a flux capacity of the order of three times the maximum residual flux capacity of the magnetic record medium.

25. A magnetic playback apparatus for reproducing a magnetic signal recorded on a magnetic record medium, comprising a magnetic core having a pair of pole portions defining a gap for magnetically coupling the core to a magnetic record medium and comprising a bridging portion of magnetic material defining a loop magnetic signal flux path with said pole portions and said gap, electrical conductor means directly linking said bridging portion for generating an exciting flux therein which is directed generally longitudinally with respect to said signal flux path in said bridging portion, means operatively associated with said core for producing an electric output in accordance with the signal flux introduced into the core at said gap by the record medium, said bridging portion having a greatly reduced cross section in comparison to the cross section of the other portions of said loop magnetic path, and means whereby a maximum signal recorded on the record medium will produce a signal flux density in said bridging portion of the order of one-third the value of saturation flux density for the material of said bridging portion, said core having core portions integral with the respective pole portions, and said bridging portion comprising a bridging element of flat strip construction formed completely of integral magnetic material and formed separately from said pole portions and core portions and having respective opposite substantially flat integral free ends, said core portions having exterior surfaces in extended conforming overlapping flatwise engagement with the respective free ends of said bridging element.

26. Means for reproducing a signal recorded on a magnetic record medium which comprises a magnetic core for coupling to successive portions of the recorded signal on the record medium to cause signal flux from the recorded signal to thread a flux path in said core, said core providing a cross-section of magnetic material in at least one region of said flux path of reduced cross-section to produce a maximum flux density in the region due to a maximum signal on the record medium and any polarizing flux of the order of ⅓ the value of saturation induction for the material of said region, means for establishing a rapidly fluctuating exciting flux in said flux path, and means for producing an electrical signal from the flux variation in said flux path, said one region of said flux path of reduced cross-section comprising a bridging element of constant substantially rectangular cross-section having respective opposite free ends substantially identical in cross-section to the remainder of said element, and said core comprising core portions separate from said element and having substantially flat exterior surfaces in extended conforming overlapping flatwise engagement therewith.

27. A magnetic playback apparatus for reproducing a magnetic signal recorded on a magnetic record medium comprising a magnetic core defining a generally loop magnetic signal flux path and having means for magnetically coupling the loop path to a magnetic record medium, means defining a portion of said loop magnetic flux path of greatly reduced flux carrying capacity in comparison with other portions of said path, means for generating an exciting flux in said portion of said loop magnetic flux path of greatly reduced flux capacity, means operatively associated with said core for producing an electrical output in accordance with the flux variation in said loop magnetic flux path, and means whereby said portion of greatly reduced flux capacity has a flux capacity of the order of three times the maximum residual flux capacity of the magnetic record medium, said portion of said loop magnetic flux path of greatly reduced flux capacity comprising a bridging element of flat strip construction having respective opposite free ends, said bridging element being formed of a single piece of integral magnetic material, and said core having substantially flat exterior extended lateral surfaces in extended conforming overlapping flatwise engagement with the respective free ends of said bridging element, the sides of said core lying generally within spaced parallel planes, and said bridging element extending substantially within the space between said spaced planes.

References Cited in the file of this patent

UNITED STATES PATENTS

| | | |
|---|---|---|
| 2,423,339 | Newman | July 1, 1947 |
| 2,424,295 | Williams | July 22, 1947 |
| 2,536,260 | Burns | Jan. 2, 1951 |
| 2,608,621 | Peterson | Aug. 26, 1952 |
| 2,649,568 | Felch | Aug. 18, 1953 |
| 2,700,703 | Nordyke | Jan. 25, 1955 |
| 2,722,569 | Loper | Nov. 1, 1955 |
| 2,768,243 | Hare | Oct. 23, 1956 |